H. C. SMITH.
Preserving Fruit, &c.
No. 43,232.
Patented June 21, 1864.
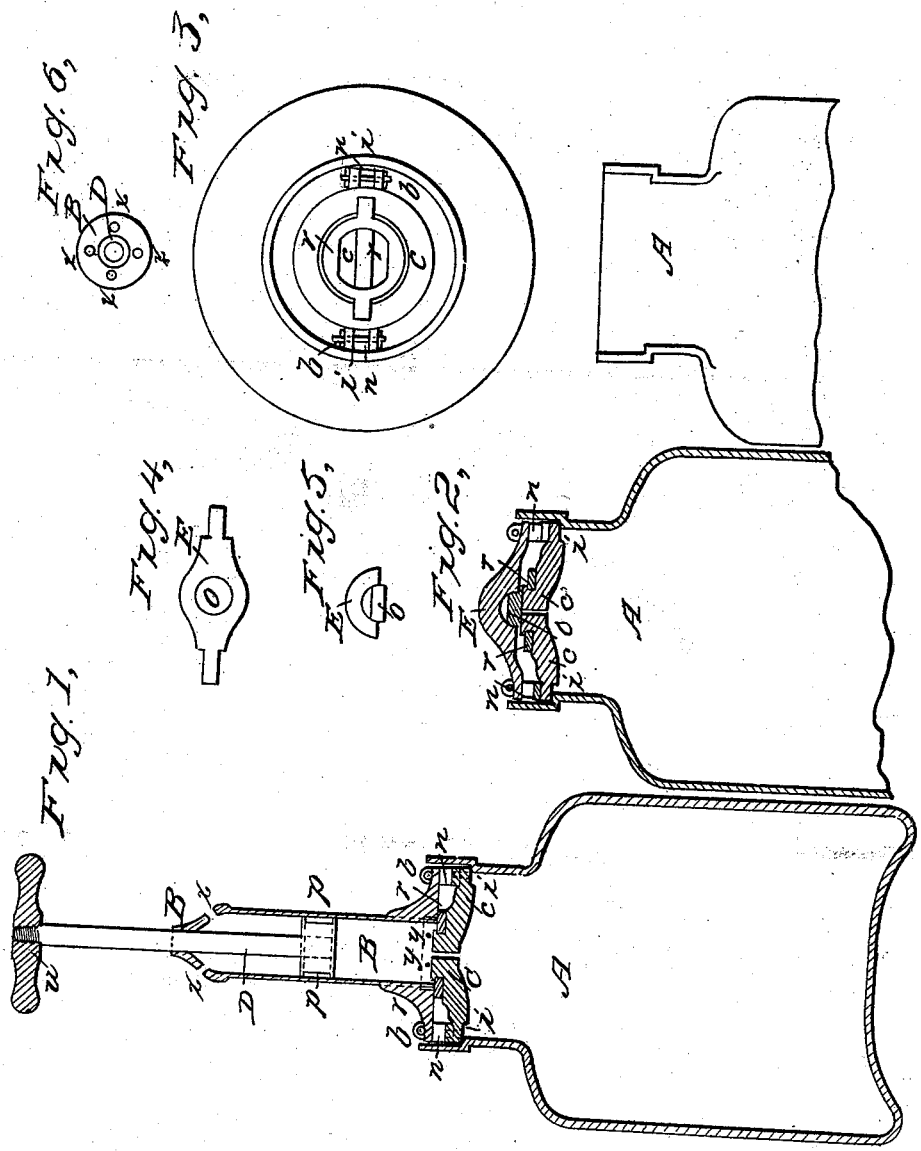

UNITED STATES PATENT OFFICE.

HARLOW C. SMITH, OF CHICAGO, ILLINOIS.

IMPROVEMENT IN PRESERVING FRUITS, &c.

Specification forming part of Letters Patent No. 43,232, dated June 21, 1864; antedated June 15, 1864.

*To all whom it may concern:*

Be it known that I, HARLOW C. SMITH, of Chicago, in the county of Cook, in the State of Illinois, have invented a new and useful Improvement in the Stoppers of Jars for Preserving Fruit and other Substances; and I do hereby declare that the following is a full, clear, and exact description thereof, reference being had to the accompanying drawings, in which—

Figure 1 is a diametrical sectional view showing the pump attached and stopper inserted, showing the interior of same when in operation. Fig. 2 is a diametrical sectional view of jar with stopper inserted and cap fastened over the valve. Fig. 3 is top sectional view showing the rubber strap valve and rubber washer and the posts and bolts used for the purpose of holding the pump fast to the stopper. Fig. 4 is a transversed view of cap, showing rubber spring for closing valve. Fig. 5 is a sectional end view of cap, showing cavity in same with rubber spring inserted. Fig. 6 is a top view of the upper end of cylinder of pump, showng the openings.

Similar letters of reference indicate corresponding parts in all the figures.

This invention is a new mode of exhausting air from vessels containing fruits, vegetables, flowers, meats, or any other analogous substances which require to be hermetically sealed for their preservation for future use.

The nature of my invention consists in the employment of an air-pump or its equivalent, in combination with a valve arrangement on the vessel or its stopper, so constructed that by some economical mechanical device it can be readily attached to any preserving-vessel for the purpose specified.

To enable those skilled in the art to make and use my invention, I will proceed to describe its construction and operation.

The glass jar A is constructed, after the usual style, with vertical sides, the top slightly compressed. The mouth or opening is formed with beveled sides, so as to admit of the gasket $i\ i$ around the stopper C C being compressed as it is inserted. The stopper C C is made tight by the use of an india-rubber gasket, $i\ i$. The stopper C C is made of brass, turned off smooth and even, being a little smaller than the aperture of the jar, so as to admit the rubber gasket $i\ i$.

On the top of the stopper C C is placed a rubber strap-valve, V, opening upward, around which is placed a rubber washer, $r\ r$, on which the pump is to rest, and on two opposite sides are situated posts $n\ n$, for the purpose of holding the pump to its place while being operated. Other valves than the one described and shown may be used in the stopper, if desired; but I consider the one herein shown to be the preferable form.

The same device as herein shown on or in the construction of the stopper may be employed upon any part of the jar, although this mode of applying my invention would involve some inconvenience.

The pump is constructed much after the style of ordinary air-pumps. Cylinder B forms the outside shell, one end of which is left open full size, so as to admit of the piston descending to the extreme end, thus producing a perfect vacuum. There is a small orifice close to the lower end of the cylinder, which is covered on the outside by a rubber strap-valve, $y\ y$, thus allowing egress of air from the cylinder when the piston descends, and closing preventing ingress of air, when the piston ascends. The top end of cylinder is made in an oval shape, with an opening in the center, through which the piston-rod D is allowed to work. There are also four openings, $x\ x\ x\ x$, around the center opening, to allow a free escape of air from the upper end of cylinder B when the piston D is making its upward stroke. To the cylinder are attached two arms, F F, set opposite each other, used for the purpose of holding the pump to the posts $n\ n$ on stopper C C.

The piston D is formed after the style of an engine-piston. On the periphery of the head is turned a groove, P P, of sufficient size to admit of a quantity of packing to make a perfect joint. The stem or piston-rod D is a round rod, a little longer than the cylinder, with head firmly attached at one end, and a cross-handle, $u$, attached by means of a screw on the other end.

E is a removable cross-bar, provided on its lower side with a rubber cushion, $e$, which is pressed down upon the strap-valve V after the air has been exhausted, and held firmly down by means of pins inserted in the posts, which thus prevents the air from getting in through said valve.

The operation of the above-described device is as follows: Upward motion is communicated to the piston D, thereby producing a vacuum in cylinder B. The valve V rises as the piston ascends, and allows the air in the vessel A to rush up into cylinder B, and as the piston descends valve V closes, and valve y y on the lower end of cylinder B opens, so as to allow the air to pass out.

Having thus described my invention, what I claim as new, and desire to secure by Letters Patent, is—

1. In the construction of stoppers for hermetically sealing jars for the preservation of fruit, the employment of a valve, substantially as and for the purposes herein specified and described.

2. In combination with the above, the cross-bar E, provided with the elastic cushion e, arranged and operating as and for the purposes set forth.

HARLOW C. SMITH.

Witnesses:
F. M. Fox,
J. A. Morrell,
C. D. Wolf.